United States Patent [19]

Dubois et al.

[11] 4,392,061
[45] Jul. 5, 1983

[54] APPARATUS FOR UTILIZING THE ENERGY OF WAVE SWELLS AND WAVES

[76] Inventors: Yves Dubois, 95, avenue Poincaré, 59700 Marcq en Baroeul; François Y. Dubois, 13, rue de la Poissonnerie, 22100 Dinan, both of France

[21] Appl. No.: 353,104

[22] Filed: Mar. 1, 1982

[30] Foreign Application Priority Data

Feb. 27, 1981 [FR] France .................. 81 04375

[51] Int. Cl.$^3$ ............................................. F03B 13/12
[52] U.S. Cl. ........................................ 290/53; 60/502; 417/330
[58] Field of Search ............. 290/42, 53; 60/496, 60/501, 502; 417/100, 330, 337

[56] References Cited

U.S. PATENT DOCUMENTS

| 4,110,630 | 8/1978 | Hendel | 290/53 |
| 4,123,185 | 10/1978 | Hagen et al. | 417/100 |
| 4,179,886 | 12/1979 | Tsubota | 60/497 |
| 4,207,739 | 6/1980 | Scarpi | 60/497 |

Primary Examiner—J. V. Truhe
Assistant Examiner—Shelley Wade
Attorney, Agent, or Firm—Harding, Earley, Follmer & Frailey

[57] ABSTRACT

The invention involves a device for utilizing the energy from sea swells and waves. The device is characterized by the combination of:
  (a) a vessel adapted to follow the regular undulations of sea swells at a place of anchorage, and constructed in a manner to face the swells so as to pitch and not to roll while anchored;
  (b) air cylinders disposed at least at one extremity of the vessel to moderate more or less the amplitude of the pitching;
  (c) watertight compartments containing a liquid;
  (d) prime movers, such as continuously powered turbines, located in the path of the liquid and suited to harness energy from the liquid as it moves so as to supply mechanical energy to at least one rotatable shaft; and
  (e) liquid deflectors located at the extremities of each water-tight compartment.

13 Claims, 9 Drawing Figures

APPARATUS FOR UTILIZING THE ENERGY OF WAVE SWELLS AND WAVES

FIELD OF THE INVENTION

The present invention involves a device for utilizing the energy from sea swells or waves to produce electricity or other forms of energy utilizable on land, such energy originating from an anchored vessel which possesses means of producing and transporting the energy to the land.

In the field of energy research, it is recognized that sea swells exist almost everywhere along unsheltered coasts. Such swells have a period that is more or less prolonged, depending on the surface of the ocean waters, and may vary from 6 to 12 seconds. It is highly desirable to attempt to harness this non-polluting energy.

STATE OF THE PRIOR ART

Efforts to obtain energy from sea swells are not new. They may be divided into two major categories:
(1) those which transform the energy from waves by variation of pressure or hydrostatic equilibrium;
(2) those which convert undulatory movement into rotating or rocking movement of mechanical elements.

Sir Christopher Cockerell's rafts and Professor Stephen Salter's "ducks" belong to this category. Those devices are fragile upon exposure to storms. The present invention is designed to remedy such drawback.

SUMMARY OF THE INVENTION

The invention involves harnessing energy from sea swells or waves by means of liquids retained in an enclosed space and displaced in accordance with a back and forth pitching motion. These liquids, of very large masses, activated at great speeds, drive hydraulic wheels, turbines or other means for the transformation or direct utilization of such energy.

More precisely, the device of the invention is characterized by the combination of:
(a) a vessel anchored at its bow and adapted to float on the surface of and to follow the regular frequencies or undulations of the sea swells at the place of the anchorage, and constituted with the aid of mechanical means to face the swells so as to pitch and not to roll;
(b) means disposed at least at one extremity of the vessel and designed to modify more or less the amplitude of the pitching;
(c) water-tight compartments containing a liquid which moves along the length of the vessel with the frequency of the pitching;
(d) means, such as turbines, located along the path of the moving liquid and suitable to harness the energy from the moving liquid so as to furnish mechanical energy to at least one rotatable shaft, energy which can be utilized to drive at least one electric generator or alternator;
(e) deflectors located at the extremities of each water-tight compartment and designed to reduce the impact of the liquid when it reaches the end of the compartment at the completion of its down stroke.

Normally, the anchored vessel is disposed so as to face the sea swells and is maintained in that position with the aid of lateral propellers such as paddle wheels, or with the aid of stern propellers which push the back of the vessel sidewise from one side or the other.

One interesting feature of the invention resides in the fact that the amplitude of pitching is controlled by means of cylinders arranged vertically at the front and at the back of the vessel, in the upper parts of which air pressure is controlled selectively by any suitable means, such as by remotely controlled valves.

The amplitude of the pitching can also be controlled by a mass which moves in a controlled way manner from the front toward the back and vice-versa.

In one embodiment of the invention, plural longitudinal water-tight compartments extending lengthwise of the vessel are interrupted by machine compartments which are located approximate the middle of the vessel. Such machine compartments may contain offset turbine-generator or turbine-alternator units having blades that change direction with each change in the inclination of the vessel. These compartments also can include, with a turbine, at least two wide flap-valves placed upstream and at least two placed downstream of each of the turbines in order to ensure a continuous flow of liquid in the same direction relative to the turbine, regardless of the direction of the flow of the liquid along the vessel.

In a second embodiment, a continuous circuit is provided for the drive liquid for the turbines, which flows through transfer passages toward the back and toward the front of the vessel, and into and out of storage compartments at the front and at the back of the vessel. The turbines are disposed at the exit of each storage compartment, and wide flap-valves are provided at the end of each transfer compartment, at the entrance to each storage compartment, to ensure continual flow of the liquid in the same direction through the circuit.

It is understood that the displacement or flow of the liquid inside the ship is determined by its pitching and that it therefore is necessary to give the vessel a hull having a shape which facilitates pitching, but avoids sinking under the waves. To achieve that, the bottom of the boat is arcuately rounded like transversely, a large diameter cylindrical segment and both its bow and stern are finely streamlined.

According to a secondary feature, tanks are provided in the bottom of the hold in order to store the work liquid in the event of an interruption in operations. Indeed, this liquid could be sea water, in which case its recovery would not be of any interest. However, as will be seen, it may be advantageous to utilize a denser liquid, the cost of which is significant and for which recovery would be necessary.

The device of the invention utilizes a type of vessel with which a great deal of practical experience exists, and which can be built to resist storms effectively. The device utilizes turbines or turbine generator units which are well-known. The novelty lies in the interior arrangement of the hull, which can be furnished from existing hulls that are restored and modified. These modifications are available at any marine yard. Other parts utilized are flap-valves, the technology of which is well-known, but which will require significant dimensions here.

This invention will be better understood with the aid of the description which follows, disclosing two non-limiting examples of its practical application, which are illustrated in the attached drawings.

DESCRIPTION OF THE PREFERRED EMBODIMENTS

Turbines are known which operate with a low fall by absorbing a large input with high outputs and which drive alternators with sufficient steadiness or continuity.

The ensemble is mounted on a boat 1 which can be a ship or any floating hulk or craft having a hull. It must be sturdy, solid and able to withstand the most violent of storms and perform by its own means.

It is moored by long towlines to orient it at a location where the sea swells are constant and sufficiently strong. It possesses specific characteristics which may vary according to the character of the sea swells. In general, and without being limited thereto, they are defined as follows:

Normal and maximum pitching of a boat is obtained when its length, at the water-line, is substantially equal to the wave length of the sea swells. But the latter vary. For the best performance, a very sheer hull is preferred. THe bottom 2 in transverse cross-section constitutes a large diameter cylindrical segment or arc, parallel to the swells, whereby it pitches unrestrained. The contour is such that it is able to follow sea swells of very different wave lengths (FIG. 1) and only rarely is balanced on three crests.

Figure 1:
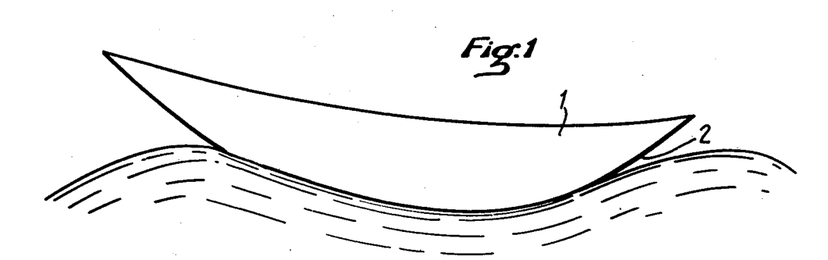
FIG. 1 is a view in side elevation of a simple vessel caught in a sea swell.
Figure 7:
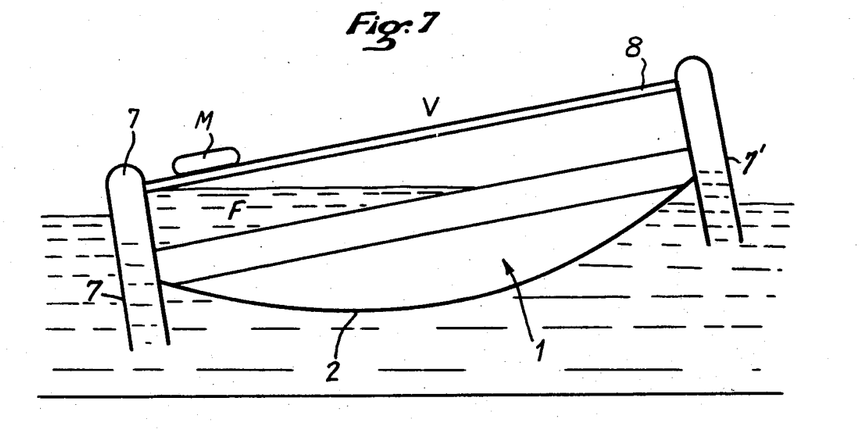
FIG. 7 is a schematic view in vertical longitudinal section showing a third version of the vessel provided with a mass for controlling the amplitude of the pitching.

The width of the vessel is a function of the desired power. It is designed to keep its stability in all circumstances. Yet, as shown in FIGS. 1, 7, it has a relatively high freeboard.

Figure 3:
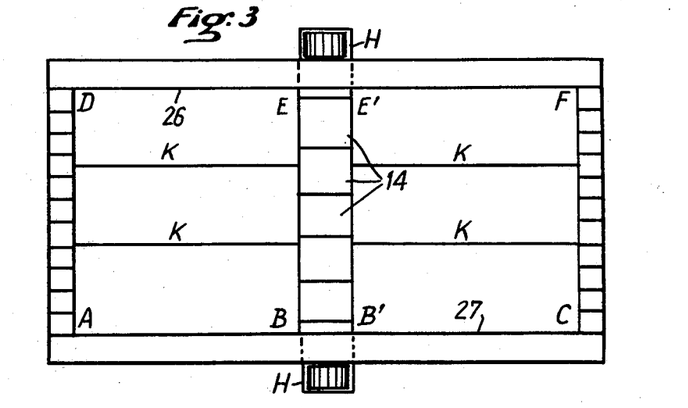
FIG. 3 is a schematic view in top plan of a vessel like that in FIG. 2.

The center of gravity is maintained rather high in order to enhance pitching. Its position can be modified by ballast, to increase or decrease the length of the boat at the waterline in accordance with the swells. For the purpose of perfect stability, calculated along with movable loads, the hull bottoms are reduced. The top-sides are significant, because the displacement, in a few seconds, of the drive fluid of several thousands of tons results in a tremendous plunge. The dip of the vessel must be cushioned and it must rise easily and rapidly. For that, and to avoid sinking, the bow and the stern are widened considerably and along each of their extremities are secured several hollow, vertical air cylinders 7, 7' open at their bottoms (which always remain immersed) and closed at their upper ends. With each incidence of down pitching, air pressure rises in cylinders 7, 7', and, according to how air intake or discharge valves (not shown) are controlled, which are located in the upper parts of the cylinders, the amplitude of the pitching of the vessel is regulated. The maneuver is accomplished automatically in unison by a selected number of cylinders shown between A and D at one end of the vessel as well as between C and F at the other end (FIG. 3).

The volume of the cylinders 7, 7' is calculated according to the movable load of the boat.

Figure 2:
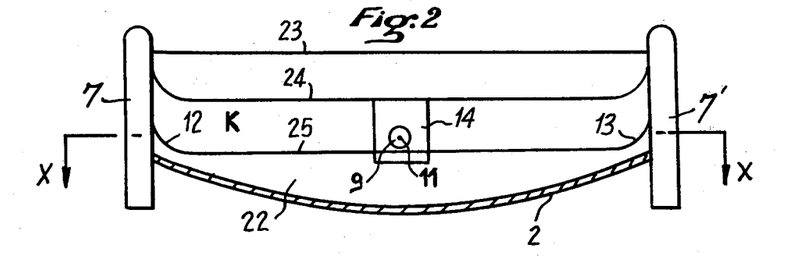
FIG. 2 is a schematic view in vertical longitudinal section of another version of the vessel with cylinders in the bow and in the stern and with machinery compartments in the center.

The interior arrangement includes (FIG. 2):
- an upper deck 23 with all security and navigation material and material for secure anchorage (not shown);
- one or several intermediary decks 24, 25 holding the drive fluids, which can be different. The highest 24 may contain sea water which if necessary may be pumped overboard. A second 25 contains a dense fluid to be stored in tanks 22 located at the bottom of the hold and thus constituting a good ballast.

On each side, one or two paddle wheels H are provided, activated by the sea current and producing electricity for on board needs. These wheels are reversible; becoming propulsive, they can be used for maneuvering and berthing, notably for positioning to face the sea swells.

At least one stern propeller (not shown) also is provided in order to prevent the movement of the vessel from one side to the other, i.e. swinging at anchor.

Longitudinal bulkheads K divide the decks 24 and 25 into plural water-tight compartments, passages or conduits for the liquids while preventing lateral flow of the liquids to avoid the danger of significant listing or capsizing.

Figure 5:
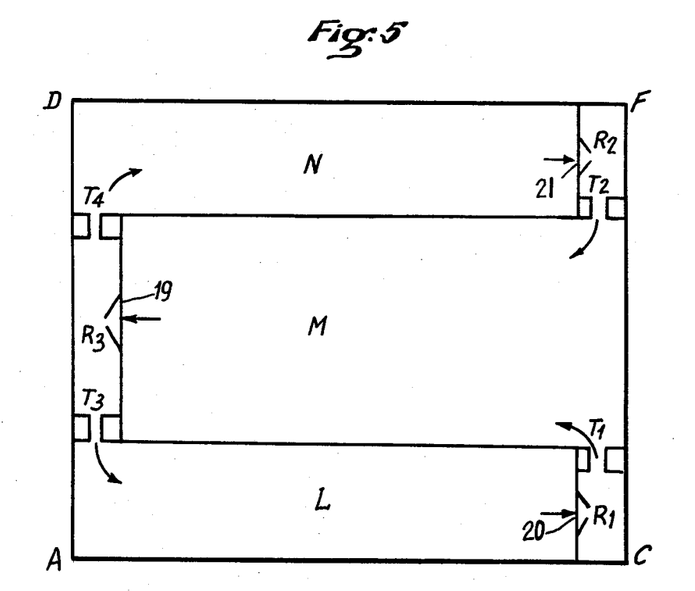
FIG. 5 is a schematic view in horizontal section of a second version of the vessel illustrating a circuit for the drive liquid of the turbines.

The drive fluid is therefore displaced from the front to the back and then returns. The drive wheels or the turbines 9 can be placed in the middle of the hull (FIGS. 2, 3), or at the extremities (FIG. 5). Numeral 14 indicates machine compartments in the middle of the hull (FIG. 3) intermediate the longitudinal water-tight compartments aforesaid located in the front and the rear of the vessel and defined by bulkheads K.

Figure 4:
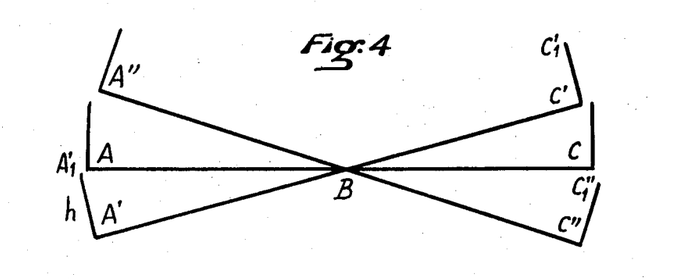
FIG. 4 is a schematic view of the oscillatory movement of the vessel shown in FIG. 3.

The drop of fall being at the end AD (FIG. 3), the liquid fills the volume A'A$_1$'B/AD, position 1 in FIG. 4. The wave arriving, the liquid is lifted and flows into space C"C$_1$"B/CF, position 2 in FIG. 4, passing through space BEB'E' (FIG. 3) where there are installed the machine compartments 14 for the turbines 9. The liquid then flows back into position 1, and so on and so forth repetitively, activating the turbines 9 with each passing.

Figure 8:
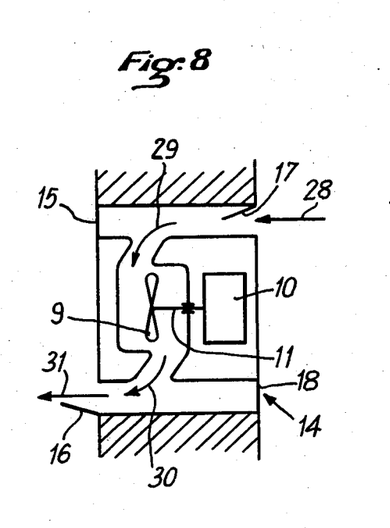
FIG. 8 is a fragmentary schematic view indicated by the arrows X—X of FIG. 2 showing a machine compartment and illustrating the flow of the liquid in a first direction.
Figure 9:
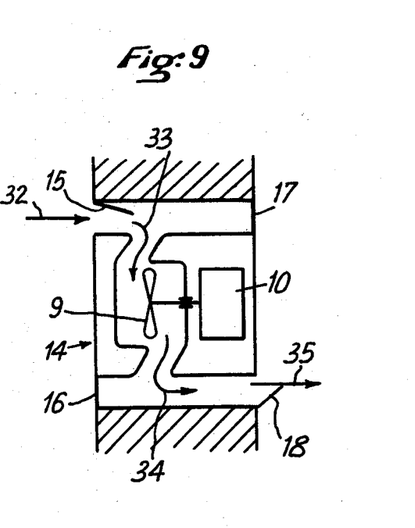
FIG. 9 is a fragmentary schematic view of the machine compartment of FIG. 8 illustrating the flow of the liquid in the opposite direction.

In order to better understand this operation, reference now is made to FIGS. 8 and 9. When end AD falls or dips, liquid flows in the direction of the arrow 28 (FIG. 8), pushing open the flap-valve 17 and closing the flap-valves 15 and 18. The liquid, following the arrow 29, passes through the turbine 9 which drives the generator 10 by the shaft 11. It discharges in the direction of the arrows 30 and 31, opening the flap-valve 16.

When end CF falls or dips, the liquid flows in the direction of the arrow 32 (FIG. 9), pushing open the flap-valve 15 and closing the flap-valves 16 and 17. The liquid, following the arrow 33, passes through the turbine 9 which drives the generator 10 by the shaft 11. It discharges in the direction of the arrows 34 and 35, opening the flap-valve 18.

The extremities of the decks 24, 25 have roundings or deflectors 12, 13 (FIG. 2) in order to reduce the impact of the liquid against the walls and to enhance the rising. The depth of the maximum fall "h" (FIG. 4) is thus increased; the depth of the average fall being "h'" (not shown).

FIG. 3 schematizes one level. It is a rectangle, but also may be a polygon, or two trapezoids joined at their wide bases, or even a rhombus. For the same volume, the liquid rises at the top of its stroke, and this results in a greater speed at the entrance to the turbines. The value of "h" varies, but several simple devices already well known enable the turbines always to turn in the same direction and regularize their speeds to drive the alternators 10 directly. This may be effectuated by sluicing and by the maintenance of a reserve of liquid in BEB'E' (FIG. 3).

The turbines also may be placed near the extremities of the hull (FIG. 5). In such case, the fall height is greater. The fluid speed v at the entrance to the turbines is higher than in the previous case, but is not double, because the speed "v" varies as $\sqrt{h}$. The path is longer. In order for the turbines to be powered at a steady rate, a reserve of water at each extremity is provided.

Figure 6:
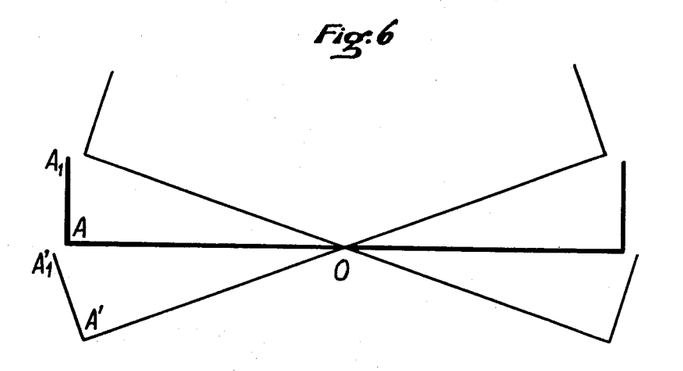
FIG. 6 is a schematic view of the movement of the vessel shown in FIG. 5.

The hull or hold is divided into three longitudinal water-tight compartments or passages L, M, N, in order to maintain the boat in equilibrium. Passages L and N (at the sides) have the same width; passage M (central) is double that width. The operation is as follows (FIGS. 5 and 6):

When end AD is in a trough, tank $R_3$ is full. The fluid flows into passages L and N via turbines $T_3$ and $T_4$.

When the next wave arrives, end AD rises, and end CF falls into a trough. Tanks $R_1$ and $R_2$ are filled through flap-valves 20, 21, and discharge through turbines $T_1$ and $T_2$. The fluid flows into passage M. Then end CF rises.

Tank $R_3$ fills through flap-valve 19 and discharges through turbines $T_3$ and $T_4$ and the cycle continues.

Tanks $R_1$, $R_2$, $R_3$ are never completely empty. THe sluices or flap-valves 19, 20, 21 being carefully regulated, the turbines turn normally.

In FIG. 5, four turbines $T_1$, $T_2$, $T_3$, $T_4$ have been put in place. Many more can be added, two or three in each group, or eight or twelve per line, according to the weight of the fluid.

On a boat that is large enough, two or three lines of turbines with three compartments per line can be installed.

Some exemplary figures offer an idea of the considerable power that may be obtained and harnessed by this invention:

I Turbines in the Middle of the Hull

Example—FIGS. 3 and 4

AC=60 m, AB=25 m, AD=60 m
Swell: wave length 50 m, trough 4 m, period 6 seconds.
Distance of fall $A'A_1'=h=8$ m.
Two falls per period, one toward the front, one toward the back, or one every three seconds.
The liquid fills the volume: area of the triangle $A'A_1'B$ multiplied by the width AD. Or:

$$\frac{A'A_1'B}{2} \times AD = \frac{8 \times 25 \times 60}{2} = 6000 \text{ m}^3$$

displaced in three seconds or 2000 m³ per second.
When the bow is raised, it is assumed that the average minimum height h' of the liquid producing the drive is equal to 4 meters.
The power produced is calculated by the formula $$P = \frac{Qd}{2g}(v^2 - z^2),$$

where
$v = \sqrt{2gh'}$
Q = Volume of liquid displaced per second in the turbine.
d = Density of the liquid; for water d = 1
v = Speed of the liquid at the entrance of the turbine.
z = Speed of the liquid at the discharge from the turbine. z being very low in proportion to v, it is omitted in the folloiwng calculations.
h = Depth of the maximum fall of the liquid generating the speed.
h' = Average depth of the fall of the liquid.
In this example,
Q = 2000 m³,
d = 1,
h' = 4 m
$v = \sqrt{2 \times 9.81 \times 4}$
$v^2 = 2 \times 9.81 \times 4$
$P_1 =$ $$\frac{2,000,000 \times 1 \times 2 \times 9.81 \times 4}{2 \times 9.81} = 8,000,000 \text{ Kgm/sec}$$

$P_1 = 8,000,000 \div 102 = 78.43$ MW (Megawatts)
1 KW = 101.94 Kilogrammeters per second
If sea water is used (d = 1.025), $P_2 = 81.35$ MW
If the fluid is sea water from salt marshes (d = 1.320), $P_3 = 136.66$ MW.
If the fluid is a concentrated solution of $CO_3K_2$ (d = 1.500), $P_4 = 176.5$ MW.

II Turbines at the Extremities of the Hull

Example—FIGS. 5 and 6

AB = 100 m
AD = 100 m
AG = 25 m
GE = 50 m
ED = 25 m
The volume of the liquid in the compartment L is equal to the area $A'A_1'O \times AG = 9375$ m³.
The same value for the compartment N is $$= \frac{9375 \text{ m}^3}{}$$
Total = 18750 m³

Wave length: 100 m
Trough: 5 m
Distance of fall $A'A_1' = h = 15$ m
Period of 10 seconds, one fall every 5 seconds Discharge per second $18750/5 = 3750$ m$^3$
$h' = 15$ m
$v = \sqrt{2 \times 9.81 \times 15}$
$v^2 = 2 \times 9.81 \times 15$
The fluid is water, $d = 1$
$P_1 =$ $$\frac{3,750,000 \times 1 \times 2 \times 9.81 \times 15}{2 \times 9.81} = 562.50 \text{ Kgm/sec}$$

With sea water ($d = 1.025$), $P_2 = 576.20$ MW
With sea water from salt marshes ($d = 1.320$), $P_3 = 959.70$ MW
With concentrated solution of $CO_3K_2$ ($d = 1.500$), $P_4 = 1239.54$ MW

We claim:

1. Apparatus for utilizing the energy of sea swells and waves, characterized by the following combination:
   (a) a vessel anchored at a place of anchorage and adapted to float on the surface of and to follow the undulations of the sea swells at the place of anchorage, said vessel having a bow, a stern, a hull, an upper deck disposed above the water internally of the hull and at least one intermediary deck located between the upper deck and the bottom of the hull;
   (b) means positioning said vessel to face the sea swells so as to enable said vessel to pitch and not roll while anchored, said positioning means including anchoring means to anchor the vessel and maneuvering means to prevent the vessel from swinging at anchor;
   (c) control means to modify the amplitude of the pitching of the vessel, said control means including at least one hollow, vertical air cylinder located at the bow and at the stern, respectively, of the vessel, said cylinders being closed at their upper ends;
   (d) plural water-tight compartments disposed on at least one of the decks of the vessel and extending longitudinally of the vessel, each compartment comprising a conduit for containment and flow of a drive liquid which moves back and forth internally of the hull along the length of the vessel with the frequency of the pitching thereof;
   (e) at least one prime mover located in the path of the moving liquid and adapted to harness the energy from the moving liquid and convert it to mechanical energy which can be utilized to drive at least one electric generator, said prime mover including a rotatable power output shaft;
   (f) deflectors located at the extremities of the water-tight compartments and adapted to reduce the impact of the moving liquid when the liquid reaches the end of a compartment during completion of its downstroke as the result of the pitching of the vessel; and
   (g) longitudinal bulkheads defining and separating parallel water-tight compartments to prevent lateral flow of the drive liquid, thereby minimizing listing of the vessel.

2. Apparatus as defined in claim 1, further including laterally disposed paddle wheels for maneuvering the vessel into a position of anchorage facing the sea swells.

3. Apparatus as defined in claim 1, further including at least one stern propeller for maneuvering the stern of the vessel toward the port side or the starboard side as required in order to position the vessel to face the sea swells.

4. Apparatus as defined in claim 1, wherein the lower ends of the air cylinders are submerged in the water and are open at their bottoms, whereby the descent of the cylinders into the water, as the result of the down pitching of the vessel, increases the air pressure in the cylinders to thereby moderate the amplitude of the pitching of the vessel.

5. Apparatus as defined in claim 1, further including:
   (a) at least one water-tight compartment disposed in the front of the vessel and at least one water-tight compartment disposed in the rear of the vessel;
   (b) at least one machine compartment disposed intermediate the front and rear water-tight compartments;
   (c) a prime mover, such as a turbine, located in each machine compartment; and
   (d) a plurality of flap-valves associated with each machine compartment permitting the moving liquid to flow into and discharge out of each machine compartment, at least two of said flap-valves being disposed upstream of each turbine and at least two of said flap-valves being disposed downstream of each turbine whereby the moving liquid always flows in the same direction relative to each turbine irrespective of the direction of flow of the moving liquid relative to the vessel.

6. Apparatus as defined in claim 1, further including:
   (a) at least one water-tight compartment disposed in the front of the vessel and at least one water-tight compartment disposed in the rear of the vessel; and
   (b) at least one turbine-generator unit disposed intermediate of the compartments, each said unit including blades adapted to change their orientation with each tilting of the vessel.

7. Apparatus as defined in claim 1, further including:
   (a) at least two longitudinal transfer passages, at least one of said passages permitting the moving liquid to flow from the bow of the vessel to its stern, and at least one of said passages permitting the moving liquid to flow from the stern to the bow;
   (b) at least one tank disposed at the bow of the vessel and at least one tank disposed at the stern of the vessel;
   (c) each tank being connected to one of the passages by a liquid inlet defined by a flap-valve, each said flap-valve being adapted to permit moving liquid to flow at a controlled rate from its passage into the tank;
   (d) each tank having an exit for the liquid whereby the moving liquid flows from the tank to one of the passageways; and
   (e) at least one turbine positioned at the exit of each tank and adapted to be driven by the moving liquid as it flows from the tank to the passageway;
   (f) said flap-valves being controllable to ensure continual flow of the moving liquid in the same direction at the controlled rate to the turbines to produce continuous rotation of the turbines.

8. Apparatus as defined in claim 1, wherein said hull is characterized by
   (a) a bottom of arcuate cross section in the form of a large diameter cylinderical element and
   (b) a finely streamlined bow.

9. Apparatus as defined in claim 1, further including storage tanks located in the bottom of the hold of the vessel to store the liquid in the event of interruption of the operation of the apparatus.

10. Apparatus as defined in claim 1, further including cushioning means located at each end of the vessel to modify the amplitude of the pitching of the vessel, said cushioning means comprising a plurality of hollow, vertical air cylinders open at their bottoms.

11. Apparatus as defined in claim 10, wherein the air cylinders are elongated and have a length sufficient for their open bottoms to remain immersed in the water during pitching of the vessel.

12. Apparatus as defined in claim 11, wherein the air cylinders are closed to the atmosphere at their upper ends, and are provided with air valves for regulating the air pressure therein.

13. Apparatus as defined in claim 1, wherein the vessel has a hull, the length of which at the water line is substantially equal to the wave length of the sea swells.

* * * * *

UNITED STATES PATENT AND TRADEMARK OFFICE
CERTIFICATE OF CORRECTION

PATENT NO. : 4,392,061           Page 1 of 2
DATED      : July 5, 1983
INVENTOR(S): Yves Dubois and Francois Y. Dubois It is certified that error appears in the above-identified patent and that said Letters Patent are hereby corrected as shown below:

Title

Line 2,    change "WAVE" to --SEA--

Column 2

Line 10,   delete "way"

Line 33,   before "end" insert --discharge--

Line 42,   delete "like"; after the comma insert --i.e. athwartships, like--

Column 4

Line 52,   change "of" to --or--

UNITED STATES PATENT AND TRADEMARK OFFICE
CERTIFICATE OF CORRECTION

PATENT NO. : 4,392,061
DATED : July 5, 1983
INVENTOR(S) : Yves Dubois and Francois Y. Dubois It is certified that error appears in the above-identified patent and that said Letters Patent are hereby corrected as shown below:

Column 5

Line 28, change "v" to --"$\overline{v}$"--

Line 30, delete "Vh" and substitute -- $\sqrt{h}$ --

Signed and Sealed this

Thirteenth Day of December 1983

[SEAL]

Attest:

GERALD J. MOSSINGHOFF

*Attesting Officer*     *Commissioner of Patents and Trademarks*